Dec. 15, 1936. R. F. DARBY 2,064,464
TRUCK
Filed Oct. 5, 1931 2 Sheets-Sheet 1
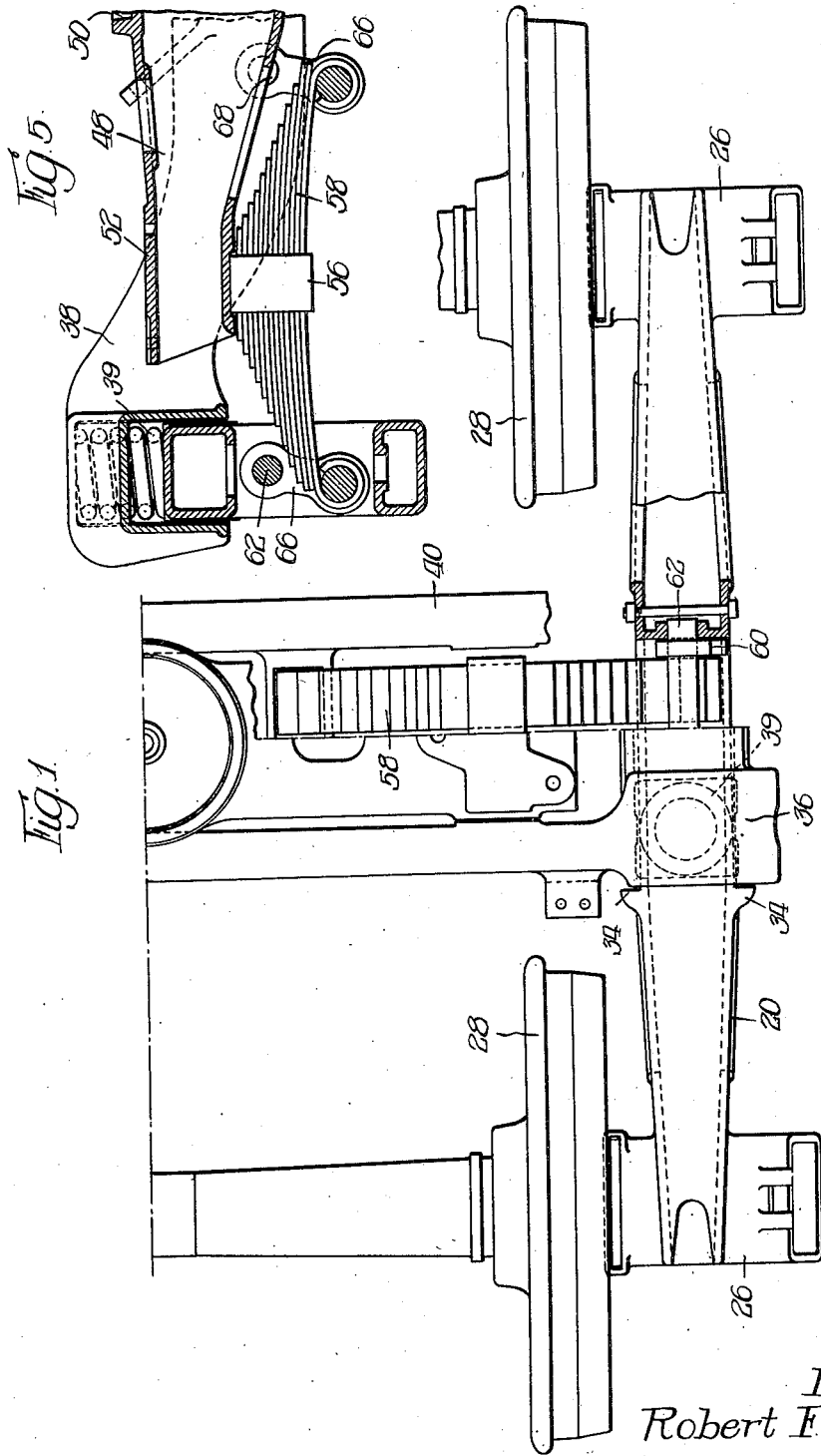
Inventor:
Robert F Darby
By Atkinson, Huxley, Byron & Knight Attys Dec. 15, 1936.  R. F. DARBY  2,064,464
TRUCK
Filed Oct. 5, 1931  2 Sheets-Sheet 2
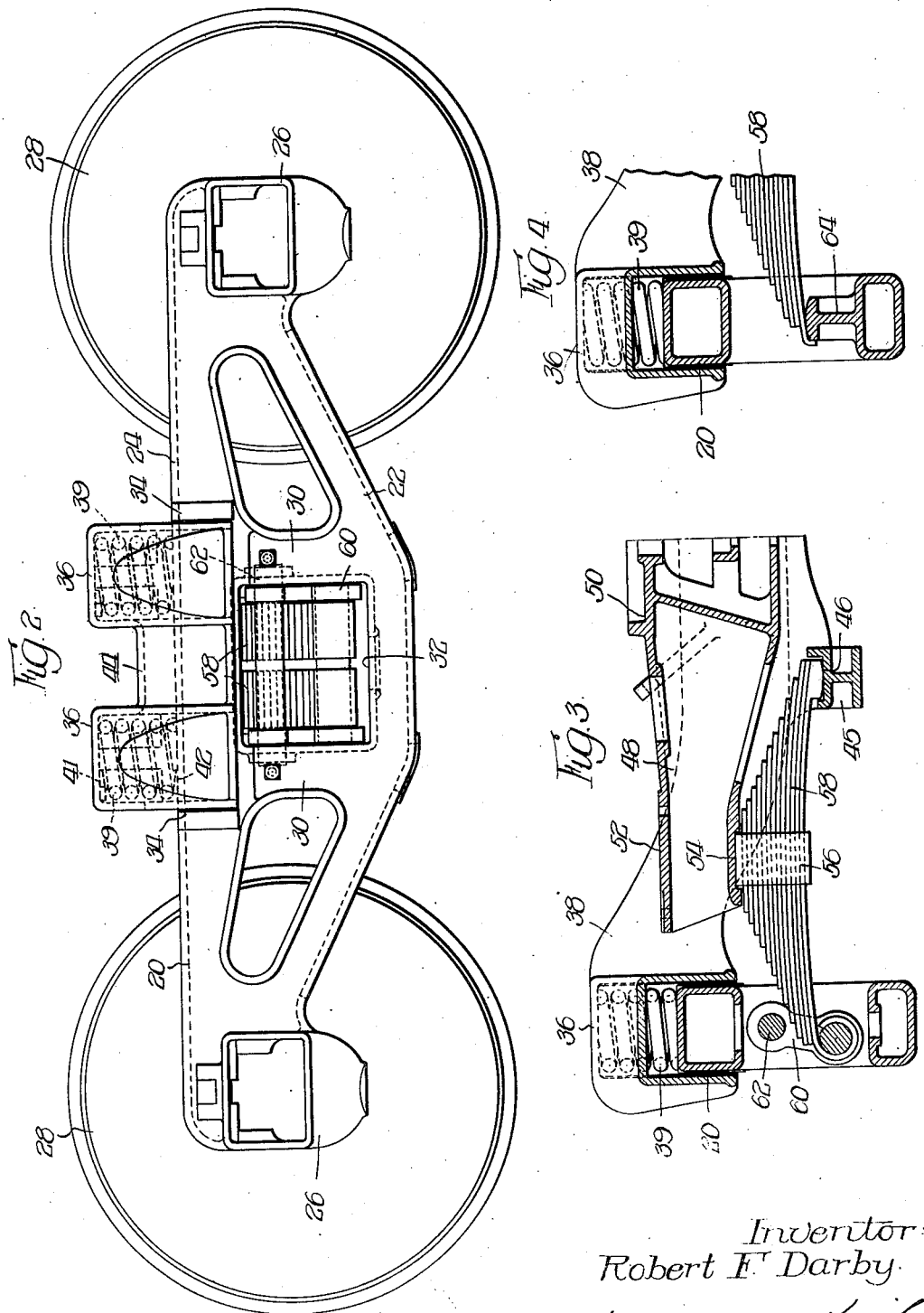
Inventor:
Robert F. Darby Patented Dec. 15, 1936

2,064,464

UNITED STATES PATENT OFFICE 2,064,464

TRUCK

Robert F. Darby, Oak Park, Ill., assignor to American Steel Foundries, Chicago, Ill., a corporation of New Jersey Application October 5, 1931, Serial No. 566,870

39 Claims. (Cl. 105—197)

This invention pertains to truck construction and more particularly to high speed four-wheel trucks.

In freight cars in general use today it is desired that as economical a construction as possible be provided, yet one which is reliable as well as of adequate strength. The riding qualities in freight cars have been of secondary consideration for the reason that until comparatively recently freight train speeds have been very low. With the increase in freight train speeds to a point where they are operating substantially on passenger train schedules there has been a necessity for providing an easier riding truck in order that the ladings will not be badly damaged. In passenger car trucks, of course, this can be accomplished as these trucks are designed primarily for safety and riding qualities, and cost is not a serious factor. On account of the cost of passenger car trucks the railroad companies hesitate to equip freight cars with them as this would make the cost of a freight car, considering its use, very excessive.

It is an object of this invention, therefore, to provide a truck which is inexpensive to make and maintain, is of sturdy character, yet one in which the riding qualities approximate those of a passenger truck of improved design.

Another object of this invention is to provide a truck wherein the weight disposition when the train is in motion will be such as to prevent derailments, and any excessive swaying will be properly apportioned to the sides of the car.

A further object of this invention is to provide a high speed freight truck wherein the relative movement between certain of the parts thereof is effectively snubbed.

A yet further object of this invention is to provide a truck construction wherein the transom only carries substantially fifty percent of the load, and wherein this load is imparted at substantially the center of the transom.

A different object is to provide a truck construction wherein there is a marked economy in spring material in a four-wheel truck by an arrangement which will provide improved riding qualities.

A still different object is to provide a truck construction wherein springs are provided in series, the said springs having a different fundamental period of vibration and being of such frequency that multiples are not synchronous within the usual periods of operation.

A yet different object is to provide a truck construction wherein coil and leaf springs are disposed so that the leaf spring operates as a spring and also as an equalizer to cause dampening of the oscillations of the coil springs.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a top plan view partly in section of a truck construction embodying the invention;

Figure 2 is a side elevation of the truck construction shown in Figure 1;

Figure 3 is a fragmentary transverse sectional elevation taken substantially on the transverse center line of the truck construction shown in Figures 1 and 2;

Figure 4 is a fragmentary sectional elevation of a modified form of truck construction, the same being taken substantially on the transverse center line of such truck;

Figure 5 is a sectional elevation corresponding to Figure 3 showing a modified form of construction.

Referring first of all more particularly to the constructions illustrated in Figures 1, 2 and 3, the side frame 20 is preferably of truss construction, including the tension member 22 and the compression member 24 merging adjacent their ends and provided with the journal boxes 26 of any preferred type, the journal boxes cooperating with the journal ends of the wheel and axle assemblies 28, also of any preferred type. The tension and compression members are connected by means of the integral spaced columns 30 forming a window 32. The compression member 24 is provided with spaced guide lugs 34 forming guide members for the depending jaws of the spaced spring housings 36 provided on the transom 38.

The transom 38 includes spaced transversely extending members 40 provided with said spaced spring housings 36, the spring housings 36 being disposed substantially in vertical alignment with the columns 30 and the jaws embracing a portion of the compression member. The coil spring assemblies 39 are disposed in the spring housings seated on the seat 41 and on the seat 42 provided on the compression member. The coil spring assemblies 39 may be of any desired type, such as constant pitch, variable pitch, variable stiffness, variable section, or of any form such as shown in application Serial No. 552,153, filed July 21, 1931, in the name of William C. Hedgcock. The spring housings are connected by means of the integral member 44 also having a depending portion embracing the compression member. The spaced members 40 of the transom are connected inwardly of the side frames by means of the cross bar 45 having the spring seat 46, said bar extending below the bolster 48.

The bolster 48 is disposed between the spaced members 40 and is provided with the usual center and side bearings 50 and 52. The bolster is provided with the seat 54 supported on the spring band 56 of the semi-elliptic spring assembly 58, the inner end of said leaf spring assembly being positioned on the seat 46, and the outer end of the leaf spring assembly being supported on the link shackle 60 pivoted to the columns as at 62 in order to accommodate changes in the length of the spring during deflection. The shackle arrangement may be replaced by means of the spring seat 64, such as shown in Figure 4, which is a rigid seat provided on the lower arch bar of the tension member, the outer end of the leaf spring assembly 58 being supported on the seat 64 and merely slipping on said seat upon deflection of the spring.

The truck construction shown in Figure 5 is similar to that shown in Figures 1 to 3 inclusive, with the exception that the spaced members 40 are provided with a link shackle 66 pivoted as at 68 and supporting the inner end of the leaf spring 58, so that the bolster is adapted for lateral motion through the link shackles 60 and 66. It will of course be appreciated that lateral motion rollers may be applied between the bolster and spring band 56 in either of the modifications shown in Figures 1 to 4 inclusive, for producing the same result.

It is also appreciated that rubber or other resilient pads may be used between the springs and/or truck parts to deaden sound, and it is to be understood that I do not wish to be limited by the exact embodiments of the device shown which are merely by way of illustration and not limitation, as various and other forms of the device will of course be apparent to those skilled in the art without departing from the spirit of the invention or the scope of the claims.

What is claimed is:

1. In a car truck, the combination of side frames each including a tension and compression member and spaced integrally connecting columns forming a window, a transom connecting said side frames and including spaced members having end connecting members extending over and embracing said compression members and having coil spring seats, coil springs mounted between said seats and said compression member whereby said transom is slidably and resiliently mounted on said side frames, a bolster disposed between said spaced members, spring seats disposed on said transom and on said side frames between said columns, and semi-elliptic leaf springs mounted on said spring seats and supporting said bolster adjacent the ends thereof.

2. In a car truck, the combination of side frames each including a tension and compression member and spaced integrally connecting columns forming a window, a transom connecting said side frames and including spaced members having end connecting members extending over and embracing said compression members and having coil spring seats, coil springs mounted between said seats and said compression member whereby said transom is slidably and resiliently mounted on said side frames, said coil springs being substantially above said columns, a bolster disposed between said spaced members, spring seats disposed on said transom and on said side frames between said columns, and semi-elliptic leaf springs mounted on said spring seats and supporting said bolster adjacent the ends thereof.

3. In a truck, the combination of a side frame having tension and compression members and integral connecting columns forming a window, a transom having spaced members, said transom having portions embracing said compression member, resilient means between said portions and frame, a bolster disposed between said spaced members and means for supporting said bolster whereby part of the load therefrom is transferred directly to said side frame and part to said side frame through said transom.

4. In a truck, the combination of a side frame having tension and compression members and integral connecting columns forming a window, a transom having spaced members, said transom having portions embracing said compression member, resilient means between said portions and frame, a bolster disposed between said spaced members, and means for resiliently supporting said bolster whereby part of the load therefrom is transferred directly to said side frame and part to said side frame through said transom.

5. In a truck, the combination of a side frame, a transom having spaced members, said transom having portions embracing said side frame, resilient means between said portions and frame, a bolster disposed between said spaced members and resiliently supported on said side frame and spaced members by a resilient mounting, one end of the resilient mounting being swingable.

6. In a truck, the combination of a side frame having tension and compression members and integral connecting columns forming a window, a transom having spaced members, said transom having portions embracing said compression member, resilient means between said portions and frame, a bolster disposed between said spaced members, and supporting means for said bolster having seating relation with said side frame and transom.

7. In a truck, the combination of a side frame having tension and compression members and integral connecting columns forming a window, a transom having spaced members, said transom having portions embracing said compression member, resilient means between said portions and frame, a bolster disposed between said spaced members, and resilient supporting means for said bolster having seating relation with said side frame and transom.

8. In a truck, the combination of a side frame having tension and compression members and integral connecting columns forming a window, a transom having a spring housing, said transom having a portion embracing said side frame, a spring disposed in said housing and supported on said compression member, and a bolster connected to said side frame and transom.

9. In a truck, the combination of a side frame having tension and compression members and integral connecting columns forming a window, a transom having a spring housing, said transom having a portion embracing said compression member, a spring disposed in said housing and supported on said side frame, a bolster, and a resilient mounting for said bolster having seating relation with said transom and side frame.

10. In a truck, the combination of a side frame having tension and compression members and integral connecting columns forming a window, a transom having a spring housing, said transom having a portion embracing said compression member, a spring disposed in said housing and supported on said side frame, a bolster, and a bolster mounting connected at spaced points to said transom and side frame.

11. In a truck, the combination of a side frame having tension and compression members and integral connecting columns forming a window, a transom, and springs disposed between said transom and compression member, said compression member having spring seats disposed on the top thereof and substantially above said columns.

12. In a truck, the combination of a side frame having tension and compression members and integral connecting columns forming a window, a transom comprising spaced members connected adjacent their ends by an integral member embracing said compression member, and a spring disposed between said integral member and compression member for supporting said transom on said side frame, and a bolster supported by said side frame between said spaced members.

13. In a truck, the combination of a side frame having tension and compression members and integral connecting columns forming a window, a transom comprising spaced members connected adacent their ends by an integral member embracing said compression member, spaced springs disposed between said integral member and compression member substantially above said columns for supporting said transom on said side frame, and a bolster supported on said side frame and transom.

14. In a truck, the combination of a side frame having tension and compression members and integral connecting columns forming a window, said compression member having spaced lugs thereon, a transom resiliently supported on said compression member and having portions disposed to be guided by said lugs, and a bolster resiliently supported on said tension member and transom.

15. In a truck, the combination of a side frame having tension and compression members and ntegral connecting columns forming a window, said compression member having spaced lugs thereon, a transom resiliently supported on said compression member and having portions disposed to be guided by said lugs, and a bolster resiliently supported on said columns and transom.

16. In a truck, the combination of a side frame having tension and compression members and integral connecting columns forming a window, and a transom resiliently supported on said compression member at spaced points substantially above said columns.

17. In a truck, the combination of a side frame having tension and compression members and integral connecting columns forming a window, a transom, said transom being resiliently supported on said compression member at spaced points substantially above said columns, and a bolster resiliently supported on said transom and side frame.

18. In a truck, the combination of a side frame having tension and compression members and integral connecting columns forming a window, a transom, said transom being resiliently supported on said compression member, and a bolster supported on said transom and columns.

19. In a car truck, the combination of a side frame having tension and compression members and integral connecting columns forming a window, a bolster, a transom resiliently supported on said compression member, a leaf spring swingably connected to said columns and connected to said transom for supporting said bolster.

20. In a truck, the combination of a side frame having tension and compression members and integral connecting columns forming a window, a transom, resilient means associated with said side frame and substantially above said columns for supporting said transom, and a bolster resiliently supported on said side frame and transom.

21. In a truck, the combination of a side frame having tension and compression members and integral connecting columns forming a window, a transom, said transom being resiliently supported on said side frame, and a bolster supported on said columns and transom.

22. In a truck, the combination of a side frame having tension and compression members and integral connecting columns forming a window, a transom, said transom being resiliently supported on said side frame, and a bolster resiliently and swingably supported on said side frame and connected to said transom.

23. In a truck, the combination of a side frame having tension and compression members and integral connecting columns forming a window, a transom having portions embracing said side frame, resilient means between said portions and frame and substantially in vertical alignment with said columns, and a bolster swingably supported on said transom and said side frame.

24. In a truck, the combination of a side frame having tension and compression members and integral connecting columns forming a window, a transom having portions embracing said side frame, resilient means between said portions and frame, and a bolster resiliently and swingably supported on said transom and in said window.

25. In a truck, the combination of a side frame having tension and compression members and integral connecting columns forming a window, a transom having a spring housing, said transom having a portion embracing said side frame, a coil spring disposed in said housing and supported on said side frame, and a bolster swingably connected to said side frame and transom through a semi-elliptic leaf spring.

26. In a car truck, the combination of side frames each including a tension and compression member and spaced integrally connecting columns forming a window, a transom connecting said side frames and including spaced members having end connecting members extending over and embracing said compression members and having coil spring seats, coil springs mounted between said seats and said compression members whereby said transom is slidably and resiliently mounted on said side frames, a bolster disposed between said spaced members, link shackles pivoted to said spaced members and said columns, and semi-elliptic leaf springs mounted on said shackles and supporting said bolster for lateral movement.

27. In a car truck, the combination of side frames each including a tension and compression member and spaced integrally connecting columns forming a window, a transom connecting said side frames and including spaced members having end connecting members extending over and embracing said compression members and having coil spring seats, coil springs mounted between said seats and said compression members whereby said transom is slidably and resiliently mounted on said side frames, said coil springs being substantially above said columns, a bolster disposed between said spaced members link shackles pivoted to said spaced members and said columns, and semi-elliptic leaf springs mounted on said shackles and supporting said bolster for lateral movement.

28. In a car truck, the combination of side frames each including a tension and compression member and spaced integrally connecting columns forming a window, a transom connecting said side frames and including spaced members having end connecting members extending over and embracing said compression members and having coil spring seats, coil springs mounted between said seats and said compression member whereby said transom is slidably and resiliently mounted on said side frames, a bolster disposed between said spaced members, fixed spring seats disposed on said transom and on said side frames between said columns, and semi-elliptic leaf springs mounted on said spring seats and supporting said bolster adjacent the ends thereof.

29. In a car truck, the combination of side frames each including a tension and compression member and spaced integrally connecting columns forming a window, a transom connecting said side frames and including spaced members having end connecting members extending over and embracing said compression members and having coil spring seats, coil springs mounted between said seats and said compression member whereby said transom is slidably and resiliently mounted on said side frames, a bolster disposed between said spaced members, fixed spring seats disposed on said transom, movable spring seats mounted on said side frames between said columns, and semi-elliptic leaf springs mounted on said spring seats and supporting said bolster adjacent the ends thereof.

30. In a car truck, the combination of side frames each including a tension and compression member and spaced integrally connecting columns forming a window, a transom connecting said side frames and including spaced members having end connecting members extending over and embracing said compression members and having coil spring seats, coil springs mounted between said seats and said compression member whereby said transom is slidably and resiliently mounted on said side frames, a bolster disposed between said spaced members, fixed spring seats disposed on said transom, swingable link shackle spring seats pivoted on said side frames between said columns, and semi-elliptic leaf springs mounted on said spring seats and supporting said bolster adjacent the ends thereof.

31. In a truck, the combination of a side frame, a load carrying member, resilient means for supporting the same on said side frame, a leaf spring supported adjacent one end by said load carrying member, rocker means for supporting the other end of said leaf spring by said side frame, and a second load carrying member supported by said leaf spring.

32. In a truck, the combination of a side frame, a load carrying member, resilient means for supporting the same on said side frame, a leaf spring, rocker means for supporting said leaf spring on said side frame and said load carrying member, said leaf spring having seating relation with said rocker means at points spaced transversely of said truck, and a second load carrying member supported by said leaf spring.

33. In a truck, the combination of a side frame having tension and compression members and integral connecting columns forming a window, a transom having spaced members, said transom having portions embracing said compression member, resilient means between said portions and compression member, a bolster disposed between said spaced members, and additional means supporting said bolster on said spaced members and side frame.

34. In a truck, the combination of a side frame having tension and compression members and integral connecting columns forming a window, a transom having spaced members, said transom having portions embracing said compression member, resilient means between said portions and compression member, a bolster disposed between said spaced members, and additional resilient means supporting said bolster on said spaced members and side frame.

35. In a truck, the combination of a side frame having tension and compression members and integral connecting columns forming a window, a transom having spaced members, said transom having portions embracing said compression member, resilient means between said portions and compression member, a bolster disposed between said spaced members, and additional means supported on seats associated with said spaced members and side frame for supporting said bolster.

36. In a truck, the combination of a side frame having tension and compression members and integral connecting columns forming a window, a transom having spaced members, said transom having portions embracing said compression member, resilient means between said portions and compression member, a bolster disposed between said spaced members, and additional resilient means supported on seats associated with said spaced members and side frame for supporting said bolster.

37. In a car truck, the combination of a side frame having tension and compression members and integral column guides forming a window, a load carrying member supported on said compression member and movable relative to said side frame, a second load carrying member, resilient means for supporting said second-named load carrying member, means adjacent said side frame for supporting said resilient means at one point, and means for supporting said resilient means on said first-named load carrying member at another point.

38. In a car truck, the combination of a side frame having tension and compression members and integral column guides forming a window, a load carrying member supported on said compression member and movable relative to said side frame, a second load carrying member, resilient means for supporting said second-named load carrying member, means within the plane of said side frame for supporting said resilient means at one point, and means for supporting said resilient means on said first-named load carrying member at another point.

39. In a car truck, the combination of a side frame, a load carrying member supported on said compression member and movable relative to said side frame, a second load carrying member, resilient means for supporting said second-named load carrying member, means within the plane of said side frame for supporting said resilient means at one point, and means for supporting said resilient means on said first-named load carrying member at another point.

ROBERT F. DARBY.